(12) United States Patent
Vangal et al.

(10) Patent No.: US 8,379,659 B2
(45) Date of Patent: Feb. 19, 2013

(54) PERFORMANCE AND TRAFFIC AWARE HETEROGENEOUS INTERCONNECTION NETWORK

(75) Inventors: Sriram R. Vangal, Portland, OR (US); Nitin Y. Borkar, Hillsboro, OR (US); Zhen Fang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 344 days.

(21) Appl. No.: 12/748,794

(22) Filed: Mar. 29, 2010

(65) Prior Publication Data

US 2011/0235531 A1 Sep. 29, 2011

(51) Int. Cl.
*H04L 12/54* (2006.01)

(52) U.S. Cl. .................................................. 370/429

(58) Field of Classification Search .................. None
See application file for complete search history.

(56) References Cited

U.S. PATENT DOCUMENTS

| | | | |
|---|---|---|---|
| 6,009,488 A | 12/1999 | Kavipurapu | |
| 7,181,544 B2 | 2/2007 | Vangal et al. | |
| 7,324,540 B2 | 1/2008 | Vangal et al. | |
| 7,343,433 B2 * | 3/2008 | Yoon et al. | 710/52 |
| 7,930,373 B2 * | 4/2011 | Diab | 709/220 |
| 2003/0063605 A1 * | 4/2003 | Ravi et al. | 370/389 |
| 2003/0221026 A1 * | 11/2003 | Newman | 710/8 |
| 2004/0158752 A1 * | 8/2004 | Borza et al. | 713/320 |
| 2005/0165985 A1 | 7/2005 | Vangal et al. | |
| 2007/0133588 A1 * | 6/2007 | Kwon et al. | 370/431 |
| 2007/0159970 A1 * | 7/2007 | Chilukoor | 370/230 |
| 2009/0055568 A1 * | 2/2009 | Subramanian et al. | 710/305 |
| 2009/0168791 A1 * | 7/2009 | Hamamoto | 370/412 |
| 2009/0293061 A1 * | 11/2009 | Schwinn et al. | 718/103 |
| 2010/0091769 A1 * | 4/2010 | Magliaro et al. | 370/352 |
| 2011/0107129 A1 * | 5/2011 | Sinykin et al. | 713/322 |

OTHER PUBLICATIONS

Umit Y. Ogras, et al., "Variation-Adaptive Feedback Control for Networks-on-Chip With Multiple Clock Domains," Jun. 8-13, 2008, pp. 1-6.

* cited by examiner

*Primary Examiner* — Chirag Shah
*Assistant Examiner* — Amar Persaud
(74) *Attorney, Agent, or Firm* — Trop, Pruner & Hu, P.C.

(57) ABSTRACT

In one embodiment, a method includes comparing an occupancy level of a buffer of a port of a router to a threshold, and controlling the port to operate at a first voltage and frequency based at least in part on the comparison, and at least one other port of the router is controlled to operate at a second voltage and frequency. Other embodiments are described and claimed.

19 Claims, 4 Drawing Sheets

PERFORMANCE AND TRAFFIC AWARE HETEROGENEOUS INTERCONNECTION NETWORK

BACKGROUND

Many computer systems are formed from separate components, e.g., integrated circuits (ICs) coupled to a motherboard or other circuit board of the system. With the ever-increasing processing capacity and number of processing units that can be incorporated in a single IC, a system formed of a single IC such as a system-on-chip (SoC) can be incorporated into different devices such as mobile devices, embedded systems and so forth.

To connect components together, some type of interconnection network is used, and one or more routers may also be present. Currently, multiple routers of a system are highly homogeneous: different ports of a router operate at the same speed, as do different virtual channels (VCs) or other independent pathways of a port. This is a mismatch to the actual usages in SoC's where balanced traffic across ports and equal criticality across virtual channels are actually rare cases. A homogeneous design across ports and VCs inevitably results in suboptimal power consumption at the components where a lower speed is acceptable and incurs a performance penalty at the components where critical messages would benefit from a higher processing speed.

DETAILED DESCRIPTION

In various embodiments a heterogeneous router microarchitecture may be provided. At a high level, different ports of a router, different virtual channels of a port, and/or even different packets sharing one virtual channel may be allowed to operate under different clocks and voltages to match the inherent heterogeneity in processing elements and packets' software semantics. To realize heterogeneous control, one or more power controllers of a router can be used to provide individual frequency-voltage pairs for better performance/power utilization at each port, channel, and/or packet.

Figure 1:
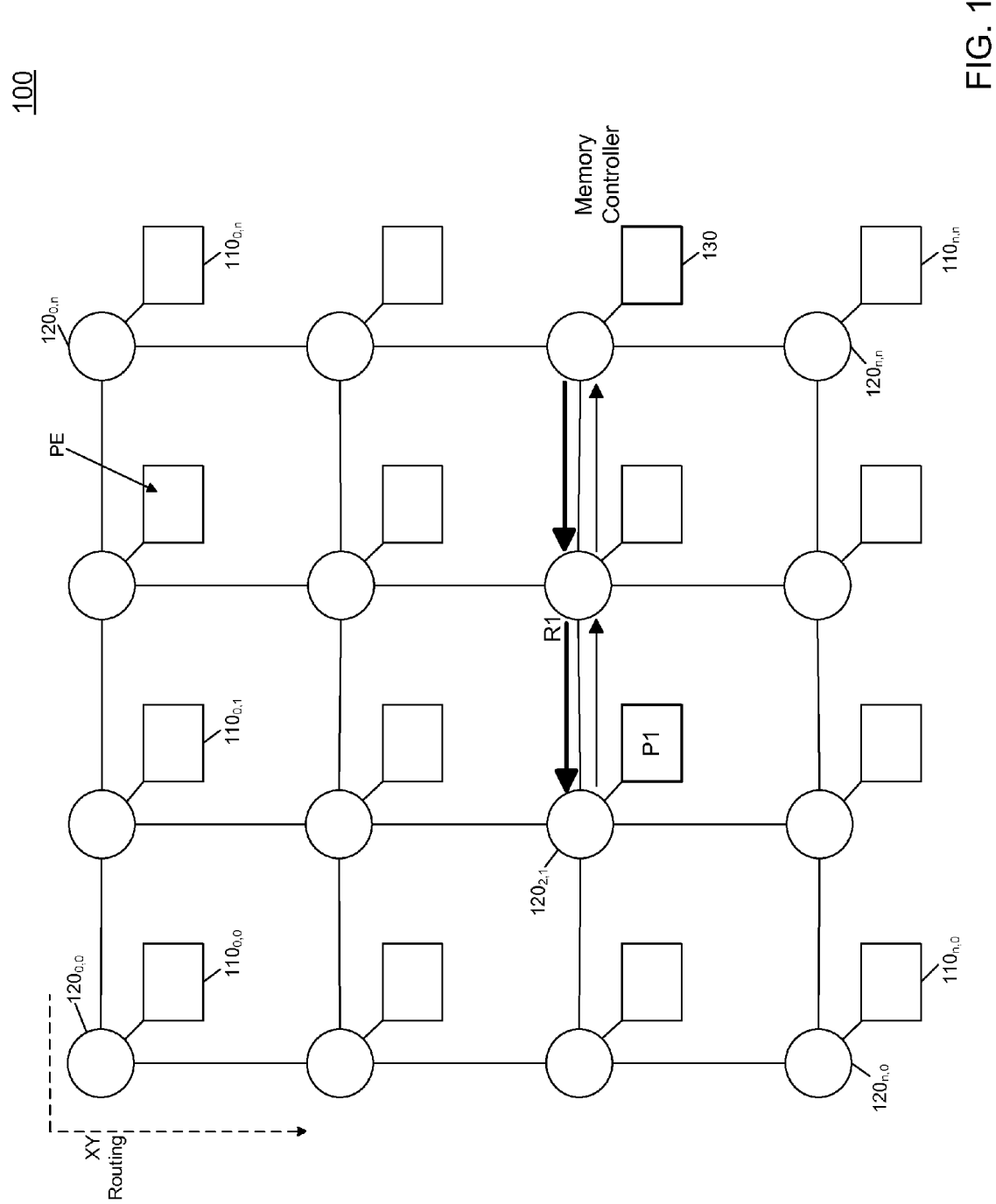
FIG. 1 is a block diagram of a system in accordance with an embodiment of the present invention.

Embodiments can be used in connection with many different types of systems. In some implementations, a system-on-a-chip (SoC) such as a network-on-a-chip (NoC) may include many cores that are coupled via a mesh-type interconnection system. Referring to FIG. 1, shown is a block diagram of a system in accordance with an embodiment of the present invention. As shown in FIG. 1, system 100 may be a system-on-a-chip including a plurality of processing engines $110_{0,0}$-$110_{n,m}$. In various embodiments, these processing engines may be cores such as general-purpose cores of a relatively simple in-order microarchitecture of a multicore processor. Or the processing engines can be homogeneous or heterogeneous processing engines having some specialized functionality such as for decoding, packet processing or other such functionality. As seen, processing engines 110 are coupled in a mesh interconnection in which each processor is coupled to a corresponding router of a plurality of routers $120_{0,0}$-$120_{n,m}$.

Each such router may include a plurality of ports each having multiple virtual channels, as will be discussed further below. These different routers can be controlled to have different operating parameters, e.g., different voltage and frequency levels, to realize differences in communications through the routers. As further seen in FIG. 1, a memory controller 130 may also be present.

As seen in the embodiment of FIG. 1, due to different types of traffic moving in different directions through a router, individual ports of the router may be independently controlled to realize the needed processing capacity as weighed against power consumption. For example, traffic from the memory controller 130 to processor P1 is predominantly in one direction, shown by the bolded lines. This scenario represents the case for a memory hierarchy with write-back caches where read traffic from main memory is usually several times higher than write traffic to memory. On router R1, for example, an input port from the memory controller would benefit from a much higher clock than an input from router $120_{2,1}$.

In addition, certain packet types in a cache-coherent system can be categorized to varying levels of criticalities. When packets are mapped to virtual channels using their criticalities, a one-clock-for-all-packets design may be suboptimal. Table 1 below shows three levels of criticality for packets in one communication protocol. As seen, message types in cache-coherent multiprocessors have different criticality properties with regard to an application's performance. In the example of Table 1, three levels of packet criticality can be based on the content of the packets. In general, the most critical packets are those relating to cache coherency message types, including various responses (Rsp), snoop packets (Snp) and acknowledgement of conflict (AckCnflt). In turn, packets of medium criticality relate to other responses that forward data, certain read request (Rd) and invalidation messages (Inv). Finally, write back requests (Wb) type messages may have a lowest priority. For example, delaying a RspI packet usually extends the cache hit latency while delaying WbMtoI is often harmless.

TABLE 1

| Most Critical | Medium Critical | Non-critical |
| --- | --- | --- |
| RspI | RspFwd | WbMtoI |
| RspS | RspFwdS | WbMtoE |
| RspCnflt | RspFwdIWb | WbMtoS |
| SnpCode | RdCur | RspIWb |
| SnpData | RdCode | RspSWb |
| SnpInvOwn | RdData | |
| SnpInvItoE | RdInvOwn | |
| AckCnflt | InvItoE | |

Figure 2:
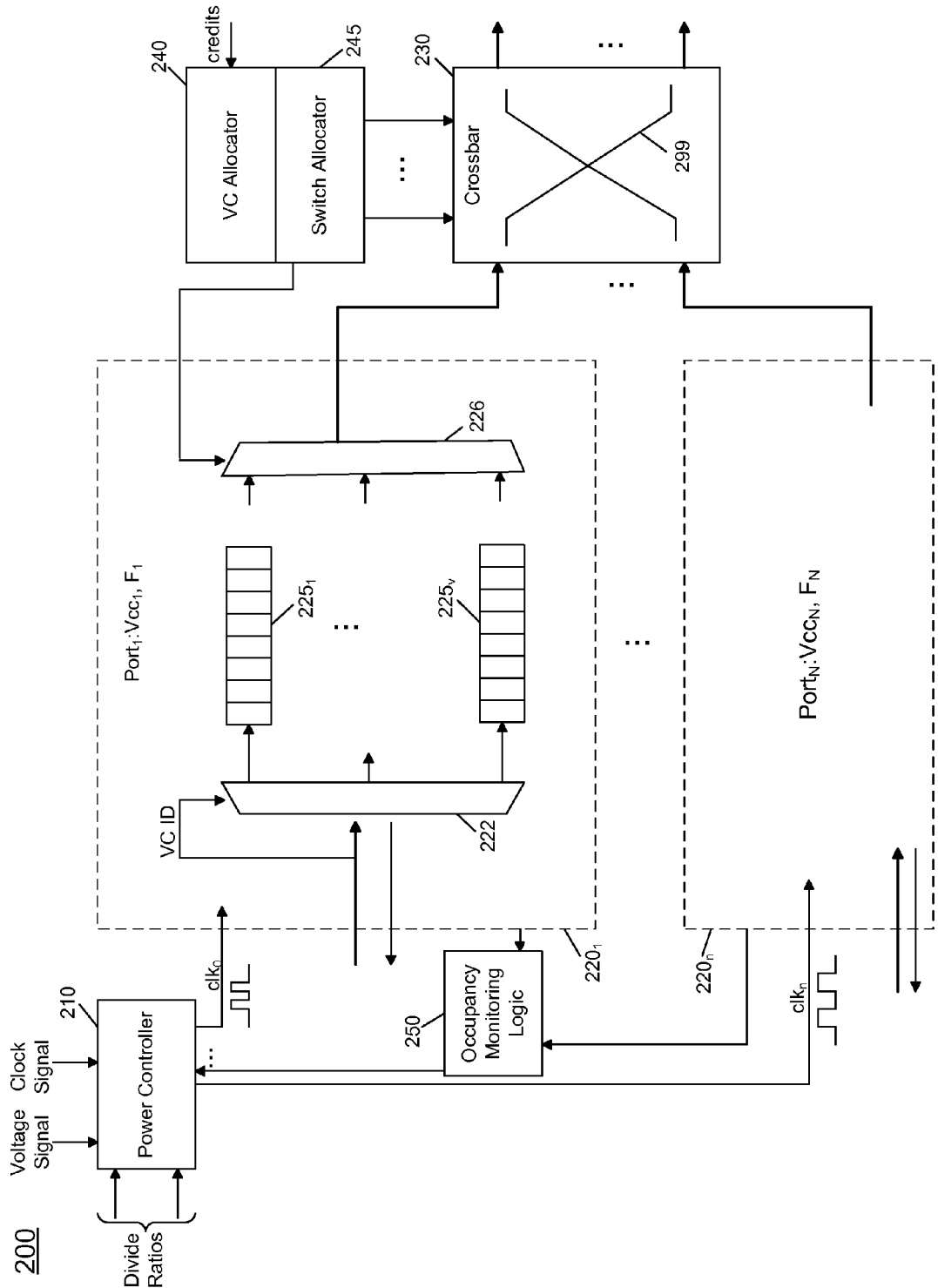
FIG. 2 is a block diagram of a router in accordance with an embodiment of the present invention.

Referring now to FIG. 2, shown is a block diagram of a router in accordance with an embodiment of the present invention. As seen in FIG. 2, router 200 may correspond to one of the routers of the SoC shown in FIG. 1. Router 200 includes a plurality of ports $220_1$-$220_n$, each of which may include multiple independent buffers. Control of to which port an incoming packet is provided may be via a cross-bar or other switching logic of another router or other agent coupled to a router. Specifically shown in FIG. 2, each port 220 may include a plurality of buffers 225 (e.g., first-in-first-out (FIFO) buffers), each associated with a different virtual channel. Note that while the indicated ports shown in FIG. 2 are in one direction, i.e., from west to east, a router can include many ports having different directions.

As seen, incoming data is input into a buffer via an input multiplexer 222 of a port to which an incoming packet is routed. Input multiplexer 222 may select from its inputs an output to be provided to a corresponding buffer based on a virtual channel identifier of the incoming packet. Similarly, the outputs of buffers 225 are coupled to an output multiplexer 226, which may be controlled by a virtual channel allocator 240. As seen, incoming credits are provided to virtual channel allocator 240, e.g., from other routers to which router 200 is coupled. Then, a given virtual channel buffer may have its output selected when it has a credit available. Switch allocator 245 may select from its various inputs a packet for transmission to a given port of another router. In some embodiments, these allocators may be combined in a single logic or controller. Different router algorithms can be used in making this determination. For example, in the case of source routing, the source of the packet specifies the entire route so the switch allocator may parse the route information included in the packet. Another type of routing algorithm may be dynamic routing, in which a packet does not have the complete route but instead only includes a destination node identifier (ID). In this case, the switch allocator may access a routing table to determine the routing. Similarly, router 200 may provide credits back to a provider of the packets. Namely, as a packet is output from a given virtual channel buffer, a credit corresponding to that virtual channel may be provided back to the entity that provided the packet to the router. The outputs from the various ports may be provided through a crossbar 230 to a selected entity to which the router is coupled, e.g., another such router or processing engine, via bi-directional node-to-node links 299.

To independently control the frequency at which the different ports operate, a power controller 210 may be present. As seen, power controller 210 is coupled to receive a global clock, which may be a global clock signal corresponding to an operating frequency. In addition, power controller 210 may receive a plurality of divide ratios, which may be statically or dynamically set, as will be described below. In some embodiments, each port has its own divide ratio. Power controller 210 is further coupled to receive a global voltage, which may be a global voltage signal corresponding to an operating voltage for the SoC. Accordingly, based on the divide ratios received and the global clock and voltage, power controller 210 may generate clock-voltage signal pairs, which may be provided to each of the ports. Although shown in the embodiment of FIG. 2 as a single power controller per router, the scope the present invention is not limited in this regard and in some embodiments, each port may have an individual power controller.

Thus the embodiment of FIG. 2 shows a heterogeneous router in which per-port clock-voltage control can be realized. Selection of frequency-voltage pairs for the implementation of FIG. 2 may be statically controlled or dynamically controlled based on occupancy of the buffers. In some implementations, one or more ports may be statically controlled, while one or more other ports may be dynamically controlled. A static implementation can be based on a priori knowledge of how traffic is likely to flow through the router. For example, when it is known that there will likely be more traffic output from a memory controller than being input to the memory controller, ports that output data from the memory controller may be controlled to operate at a higher frequency than ports directed to inputs to the memory controller.

In one embodiment, power controller 210 may select an appropriate frequency-voltage pair for each port based on information from a buffer occupancy monitoring logic 250. In one implementation, occupancy monitoring logic 250 provides divide ratio signals to dynamically control the ratio. In another implementation, system software sets the divide ratio, e.g., based on a priori knowledge of expected traffic patterns through the port. More specifically in one embodiment, the logic may perform a comparison of a number of buffer entries of a port to a threshold. Note that this comparison may be based on the occupancy of all buffers of a port, or only one or more predetermined buffers. Here, the clock/voltage of a port increases when the number of buffer entries in use exceeds a certain watermark in the port. Conversely, an empty FIFO buffer for an extended duration may indicate an idle condition (detected by occupancy monitoring logic) and clock/voltage can be gated/reduced to a lowest standby power state, substantially saving power. Run-time control allows the router to continuously adjust to varying traffic demands, achieving better tradeoffs between performance and power consumption. In a static implementation, note that logic 250 may not be present and the ratio signals can be statically controlled. In some implementations, a combination of static and dynamic control may be used, e.g., on a per-port or per-buffer basis.

Figure 3:
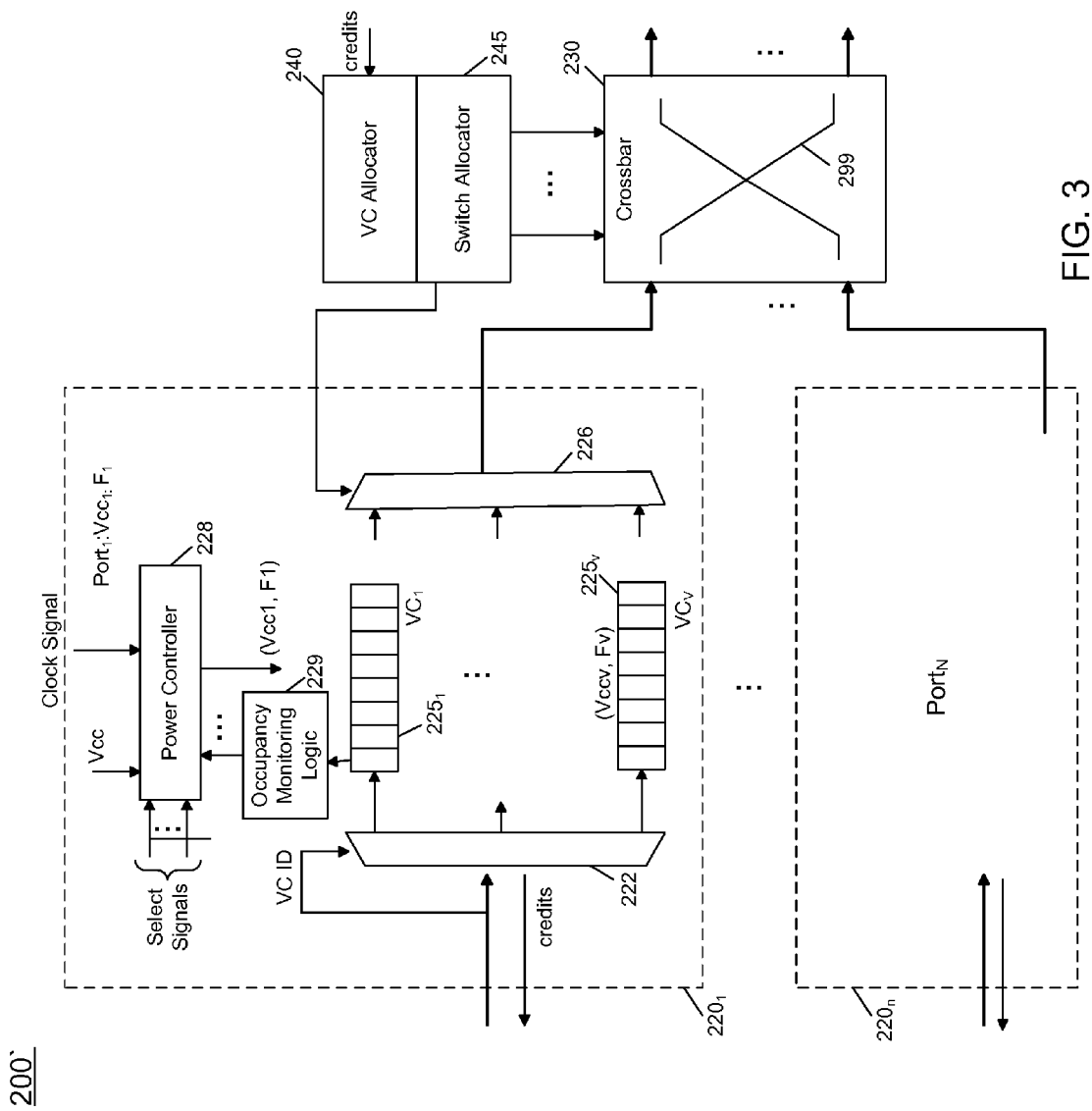
FIG. 3 is a block diagram of a router in accordance with another embodiment of the present invention.

In the embodiment of FIG. 2, the granularity of clock and voltage adaptation is per port. Thus the power controller (and occupancy monitoring logic) can be configured on a per-port basis, or each port can be configured to communicate with a single instantiation of these components. Understand that in addition to power control on a port basis, links between ports may be similarly controlled to realize power savings. In yet other embodiments, heterogeneous routers may be provided with a per-priority control of voltage/frequency. That is, in some applications rather than a per-port control, control may be of each individual buffer of a port, e.g., on a per priority or virtual channel basis for ultra fine-grain power management. Referring now to FIG. 3, shown is a block diagram of a router in accordance with another embodiment of the present invention. As shown in FIG. 3, router 200' may be similarly configured to that of FIG. 2. However, rather than a per port control, each individual buffer 225 of router 200' may have its frequency-voltage pair individually controlled. To effect such control, a power controller 228 and occupancy monitoring logic 229 may be provided per port and may output individual clock-voltage control signals to each of the virtual channel buffers 225, e.g., based on incoming select signals which may be provided from a static source (not shown in FIG. 3) or occupancy monitoring logic 229.

In one implementation, a system may be configured such that each virtual channel is allocated based on message criticality, such as a static allocation in which a first virtual channel is associated with most critical packets, a second virtual channel is associated with next critical packets, and so forth. In such implementations, the first virtual channel buffer may be operated at higher speeds than the other virtual channel buffers. In yet another implementation incorporating criticality-based virtual channels, dynamic control can be realized by controlling a set of buffers of a port such that when data is flowing through a highest priority virtual channel (associated with one buffer), other channels (and their associated buffers) may be disabled or placed into a low power standby state, allowing workload aware control. To effect this control, each packet may include a quality of service (QoS) hint such as a bit field to indicate priority of the packet. The buffer may be controlled such that when a highest priority packet is received, a high frequency is used to handle the packet through the buffer, and when a low priority packet is received, the buffer resources are controlled with a lower frequency.

Assume a system in which a first virtual channel ($VC_0$) is actively injecting/ejecting flits of highest-priority packets, the remaining channels/buffers, for example, $VC_1$ through $VC_V$, can be put into low power states. The basis for adapting clock and voltage is thus message priority in this embodiment.

Adaptation of the clock and voltage can be done in a variety of ways. For a high-performance many-core architecture, a design-time decision that is software-transparent may be used. For SoCs that contain many intellectual property (IP) blocks with QoS requirements, a run-time dynamic control mechanism based on hints provided by software can be used. For example, a low-priority direct memory access (DMA) transaction can be executed through a low-voltage, low-power path across routers between memory modules.

Figure 4:
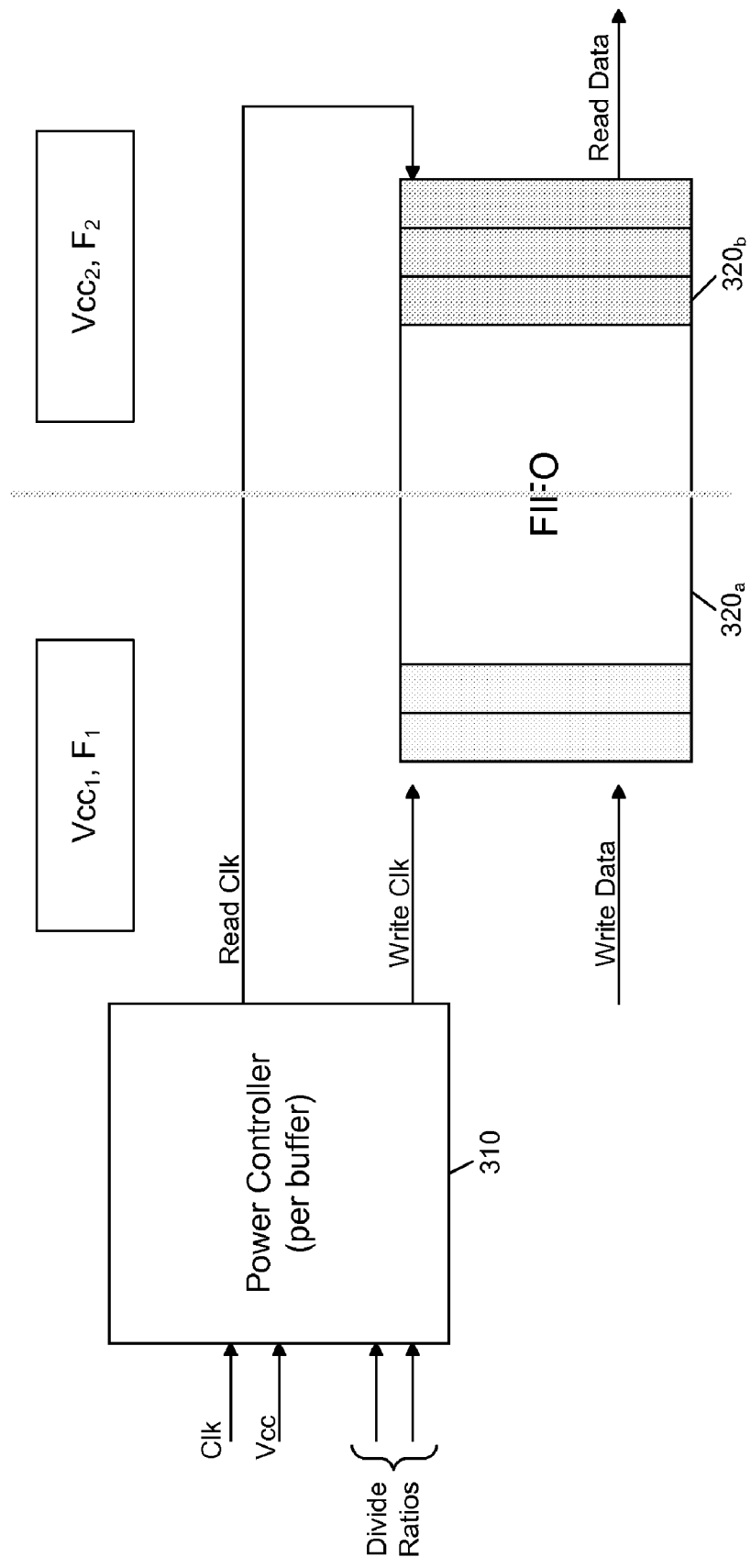
FIG. 4 is a block diagram of a buffer employing control on a packet basis in accordance with one embodiment of the present invention.

In yet other embodiments, even finer-grained control may be realized. Referring now to FIG. 4, control may be on a packet basis, e.g., according to a priority of the packet itself. This priority may be different than priority attributed to virtual channel or other such identifiers. In various embodiments, each flow control unit (e.g., a so-called flit) may have in a header (e.g., a packet header) of the unit an indicator of its priority. Based on this information, packets that share a buffer can be processed at different speeds. Specifically as shown in the embodiment of FIG. 4, a buffer 320 includes a first portion $320_a$ and a second portion $320_b$, each of which may be controlled at a different speed based on control signals obtained via, e.g., a power controller 310. As seen, power controller 310 may receive global clock and voltage signals and divide ratios which may be set via information present in a field of a packet header. Based on this information, power controller 310 may generate write clocks and read clocks to write data to a particular portion of buffer 320 and to read data therefrom. While shown with this particular implementation in the embodiment of FIG. 4, understand that other implementations for providing for fine-grain control of voltage/frequency can be realized. As one example, power control can be implemented in a router that works in synchronization with known power states of a processor (e.g., the so-called P or C states of an Advanced Configuration and Power Interface (ACPI) specification). Here, the local router and buffers (on that port) connected to the processor can also sleep (or wake) based on processor power state(s). Other implementations may further apply to routers connected to a memory controller with power aware states.

Embodiments may be implemented in code and may be stored on a storage medium having stored thereon instructions which can be used to program a system to perform the instructions. The storage medium may include, but is not limited to, any type of disk including floppy disks, optical disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    determining an occupancy level of a first buffer, the first buffer of a first port of a router coupled to a plurality of routers and at least one processor, the first port including a plurality of buffers including the first buffer and the router including a plurality of ports each including a plurality of buffers;
    comparing the occupancy level of the first buffer to a first threshold; and
    controlling the first port to operate at a first voltage and frequency based at least in part on the comparison, wherein at least one other port of the plurality of ports of the router is controlled to operate at a second voltage and frequency, each of the plurality of ports having individual voltage and frequency control.

2. The method of claim 1, further comprising dynamically controlling the first port to operate at a different voltage and frequency based on a change in the occupancy level.

3. The method of claim 1, further comprising statically controlling a second port of the router to operate at the second voltage and frequency, the static control based on a priori knowledge of a traffic pattern expected through the router.

4. The method of claim 1, further comprising routing a first packet to the first buffer based on a virtual channel identifier of the first packet.

5. The method of claim 4, further comprising selecting the first packet from an output multiplexer coupled to an output of the first buffer when a credit corresponding to the first buffer is available and routing the first packet to a predetermined port of a second router.

6. The method of claim 1, further comprising placing at least one other buffer and inbound/output links of the first port into a low power state when the first buffer stores at least one data packet.

7. The method of claim 1, further comprising:
    comparing an occupancy level of a plurality of buffers of the first port to the first threshold; and
    controlling the plurality of buffers to operate at the first voltage and frequency based at least in part on the comparison.

8. The method of claim 1, further comprising controlling each of a plurality of buffers of the first port to operate at an independent voltage and frequency based on a message criticality associated with each of the plurality of buffers.

9. An apparatus comprising:
    a router having a plurality of ports each including a plurality of virtual channel buffers coupled in parallel between an input multiplexer and an output multiplexer, wherein each of the plurality of ports is to be individually controlled to operate at a selected frequency-voltage pair based at least in part on a comparison of an occupancy level of a first one of the plurality of virtual channel buffers of the corresponding port to a threshold, wherein at least one other port of the plurality of ports of the router is controlled to operate at a different voltage and frequency.

10. The apparatus of claim 9, wherein each of the plurality of virtual channel buffers of a port is to be individually controlled to operate at a different frequency-voltage pair on a per packet basis.

11. The apparatus of claim 9, wherein when a highest priority virtual channel buffer of a first port of the plurality of ports is storing at least one packet, other virtual channel buffers of the first port are placed in a low power state, wherein each of the virtual channel buffers is associated with a priority level of packets to be stored in the corresponding virtual channel buffer.

12. The apparatus of claim 9, further comprising an occupancy monitoring logic coupled to a first port of the plurality of ports to determine an occupancy level of the first port and to compare the occupancy level to a second threshold, wherein the selected frequency-voltage pair of the first port is based at least in part on the comparison.

13. The apparatus of claim 12, further comprising a controller including a clock controller to receive a global clock signal and to provide a different clock signal to each of the plurality of ports based on a ratio signal for each of the plurality of ports and the global clock signal, and a voltage regulator to receive a voltage signal and to output a different regulated voltage to each of the plurality of ports based on the ratio signal and the voltage signal.

14. The apparatus of claim 13, wherein the controller is to receive a first ratio signal from a first input packet and to generate a write clock signal to store the first input packet in a first virtual channel buffer of the first port, the write clock signal according to the first ratio signal received in a header of the first input packet.

15. The apparatus of claim 14, wherein the first input packet and a second input packet stored in the first virtual channel buffer are processed at different speeds according to the corresponding ratio signals.

16. The apparatus of claim 9, wherein the individual control of the plurality of ports is statically based on a priori knowledge of an expected traffic pattern through the router.

17. A system comprising:
   a plurality of processing engines;
   at least one memory controller; and
   a plurality of routers to couple the processing engines and the at least one memory controller via an interconnection network, wherein each router includes a plurality of ports each having a plurality of parallel buffers coupled between an input multiplexer and an output multiplexer, a cross bar coupled to the output multiplexer, an output selection logic coupled to the output multiplexer and the cross bar to select a packet from the output multiplexer and a port of another of the plurality of routers to receive the packet, an occupancy monitoring logic coupled to the plurality of parallel buffers to determine an occupancy level of each of the plurality of parallel buffers and to compare the corresponding occupancy level to a threshold to generate a result, and a controller to receive the result, a global clock signal and a voltage signal and to provide a frequency-voltage pair for each of the plurality of parallel buffers based at least in part on the result, wherein each parallel buffer can operate at a heterogeneous frequency-voltage pair, and the plurality of processing engines, the at least one memory controller, and the plurality of routers are configured on a single semiconductor die.

18. The system of claim 17, wherein each router can be controlled to operate at heterogeneous frequency-voltage pairs further on a per packet basis.

19. The system of claim 17, wherein at least one port of one of the plurality of routers is to operate at a static voltage and frequency, the static voltage and frequency based on a priori knowledge of a traffic pattern expected through the at least one port.

* * * * *